United States Patent
Schroeder et al.

[19]

[11] Patent Number: 5,916,459
[45] Date of Patent: Jun. 29, 1999

[54] METHOD OF MATCHING MAGNETORESISTORS IN A SENSOR ASSEMBLY

[75] Inventors: Thaddeus Schroeder, Rochester Hills; Thomas Arthur Perry, Washington; Martin Stephen Meyer, Southfield; Bruno Patrice Bernard Lequesne, Troy, all of Mich.

[73] Assignee: General Motors Corporation, Detroit, Mich.

[21] Appl. No.: 08/919,544

[22] Filed: Aug. 28, 1997

[51] Int. Cl.⁶ .................................................. B23K 76/00

[52] U.S. Cl. ............... 219/121.66; 148/121; 324/207.21; 324/601

[58] Field of Search ........................ 219/121.68, 121.66; 148/121; 324/207.21, 207.25, 601, 691; 29/593, 603.1, 603.09, 607

[56] References Cited

U.S. PATENT DOCUMENTS

| | | | |
|---|---|---|---|
| 4,924,696 | 5/1990 | Schroeder et al. | 73/118.1 |
| 5,089,060 | 2/1992 | Bradley et al. | 148/103 |
| 5,091,021 | 2/1992 | Perry et al. | 148/103 |
| 5,492,572 | 2/1996 | Schroeder et al. | 219/121.66 |
| 5,570,016 | 10/1996 | Schroeder et al. | 324/207.25 |
| 5,675,886 | 10/1997 | Hase et al. | 148/121 |
| 5,754,042 | 5/1998 | Schroeder et al. | 324/207.25 |
| 5,801,529 | 9/1998 | Umemoto et al. | 324/207.21 |

*Primary Examiner*—Geoffrey S. Evans
*Attorney, Agent, or Firm*—George A. Grove; Margaret A. Dobrowitsky

[57] ABSTRACT

A method is disclosed for equalizing the electrical resistance of two or more magnetoresistor sensor elements positioned on a permanent magnet in a sensor assembly. The method may utilize a laser to reduce the magnetic field of the portion of the permanent magnet underlying the sensor with the higher electrical resistance.

10 Claims, 2 Drawing Sheets

METHOD OF MATCHING MAGNETORESISTORS IN A SENSOR ASSEMBLY

TECHNICAL FIELD

This invention pertains to magnetoresistor-based sensor assemblies of the type comprising two or more magnetoresistors mounted on a permanent magnet. More specifically, this invention pertains to a method of equalizing the electrical resistance of the magnetoresistors in the assembly.

BACKGROUND OF THE INVENTION

Magnetic position sensors are extremely important devices. They are used in the automotive industry to sense the angular position of a shaft such as the crank or cam shaft of an engine. Information on the shaft position is then used for fuel and ignition timing. In order to meet the On Board Diagnostic II misfire detection mandate, a very high degree of angular accuracy is required from the position sensor. An illustrative method and apparatus for accurately determining camshaft position is shown in U.S. Pat. No. 5,570,016, assigned to the assignee of this invention. A similar method and apparatus for a position sensor in an automotive steering system is shown in U.S. Pat. No. 4,924,696, also assigned to the assignee of this invention.

Briefly stated, the methods use two magnetic field sensors, a bias magnet, and a magnetically soft, ferromagnetic target wheel with two distinct target tracks or regions. A schematic diagram of a representative arrangement is shown in FIG. 1 of this specification. The permanent bias magnet spans and underlies the backside of both closely-spaced magnetic field sensors and opposes both target regions. The field generated from a first underlying region of the bias magnet couples strongly to the opposing region of the target and modulates the output of the first overlying magnetic field sensor. The field generated from a second underlying region of the bias magnet couples strongly to the opposing region of the target and modulates the output of a second magnetic field sensor. Cross talk between the two sensors is controlled by their physical separation. The second target track may be a mirror image of the first, providing maximum accuracy or simply a constant pattern for use as a reference signal for temperature and air gap fluctuation corrections.

In one automotive application of this technology to crankshaft angle sensors, thin film semiconductor magnetoresistors (mr's) are used as the magnetic field sense elements. This choice leads to a reasonably robust modulation of the sensor voltage and straightforward processing electronics. In practice the magnetoresistors are powered by matched current sources. The voltages generated at the two magnetoresistors are given by:

$$v_1 = i_1 \times mr_1$$

$$v_2 = i_2 \times mr_2$$

These voltages are input to a comparator circuit which converts the voltage modulation to a digital signal for use by an engine controller. The target wheel chosen has a series of long and short teeth in one track and a toothless (constant diameter) structure in the second track. Typical voltage outputs from the magnetoresistors are shown in FIG. 4. It is seen that the transition from a region of a tooth (high voltage) to a space (low voltage) has a distinct slope. The fact that this transition is not perfectly abrupt is related to the source of error in the application. If the quiescent resistance of the magnetoresistors is not well matched to one another, this will shift the switching point of the comparator.

The key to gaining the required accuracy is to improve the matching of the magnetoresistors. The mr's have an inherent mismatch due to fluctuations in their manufacture. In addition to this, the resistance of the devices will vary because of subtle differences in their bias field. The differences in the bias field come from fluctuations in the composition of the bias magnet, irregular magnetization of the bias magnet, or errors in locating the mr's with respect to the magnet's surface (i.e., devices off-center, or skewed to different heights above the surface). If one can independently adjust the bias field seen by one of the two magnetoresistors, the devices could be matched to any precision desired. This can compensate for all sources of errors: resistance fluctuations, magnet irregularities, and tolerance problems.

SUMMARY OF THE INVENTION

This invention provides a method of equalizing the electrical resistance of the magnetoresistors in a two magnetoresistor-bias magnet assembly. In the assembly, two nominally "identical" magnetoresistors are mounted with defined spacing on a planar surface of a magnetized bias magnet which is a permanent or hard magnet. The assembly will also include a lead frame with lead wires to the magnetoresistors and suitable nearby electronic circuitry for the operation of the sensor combination. The strategy of the method is to expose the two magnetoresistors to a quiescent and nominally equivalent magnetic field. Preferably the biasing magnet provides the magnetic field. In one embodiment of the invention, a ferromagnetic soft magnet, such as a low carbon steel plate, is placed next to the resistors. The highly permeable plate concentrates the magnetic field in the vicinity of the magnetoresistors and increases their resistance values. This arrangement simulates the presence of a target wheel. In another embodiment, the bias magnet mounted twin magnetoresistors are simply in air. This is a less complicated test medium.

In brief, the method is preferably practiced as follows: (1) The resistance of each of the magnetoresistors is measured in the quiescent field. (2) The larger resistance of the two is identified. (3) A short time localized surface heating is applied to the back side of the bias magnet behind the high resistance magnetoresistor to momentarily raise the temperature of a spot on the magnet to near the Curie temperature. The field of the surrounding unheated magnet body reduces or changes the direction of the field at the heated spot. This reduces the field in the vicinity of the magnetoresistor. (4) This procedure (steps 1–3) is repeated as necessary to achieve the desired matching. The shallow heat affected zone on the back surface will either have a reduced or reversed magnetization which will reduce the net field level at the position of the magnetoresistor chosen in step 2. By reducing the bias field at this site, the resistance of the individual device in the assembly will be decreased to be commensurate with the unaffected (or much less affected) device. It is noted that the inherent properties of the "identical" magnetoresistors are not affected by this method. The local properties of the bias magnet are altered to balance the performance of the sensor combination. Preferably, a laser or other similar directed energy beam is used as the source of localized heat.

In a broader aspect of the invention, the resistance value of either magnetoresistor sensor can be changed to bring the difference between their values within a predetermined tolerance or specification. For example, the lower resistance value can be increased by heating the appropriate region of the permanent magnet in the presence of a suitable supplementary applied magnetic field.

These and other objects and advantages of the invention will become more apparent from a detailed description thereof which follows. Reference will be had to the drawings which are described below.

DESCRIPTION OF THE PREFERRED EMBODIMENT

The invention may be practiced on any assembly of two or more magnetoresistors mounted on a permanent bias magnet. The practice of the invention will be described in an embodiment in which such a sensor assembly is used in combination with a target wheel such as that depicted in FIG. 1.

Figure 1:
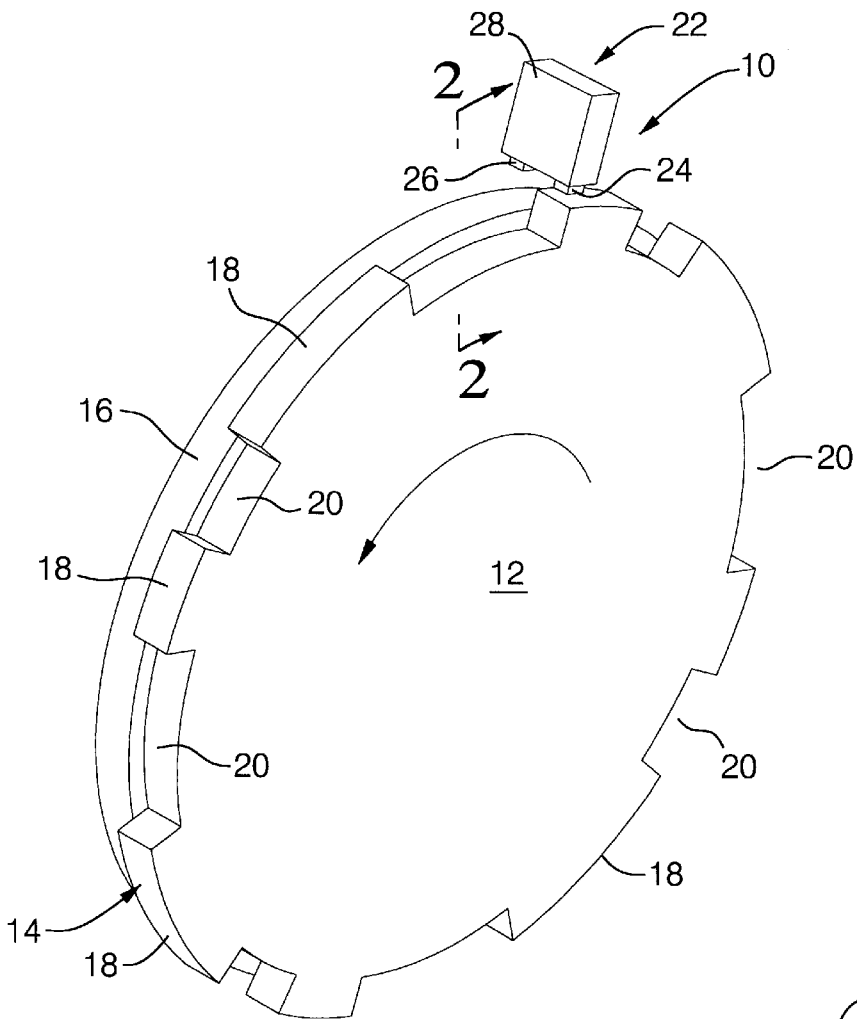
FIG. 1 is a schematic view of a magnetoresistive position sensor assembly in combination with a dual track target wheel such as might be used on an automobile to sense the angular position of a shaft such as the crank or cam shaft of an engine. The method of this invention is useful in equalizing the resistance of the magnetoresistors in the assembly.

FIG. 1 is a perspective view of a two track crankshaft angle sensor combination 10 for application with an automobile engine. Sensor combination 10 includes a wheel 12 for mounting at one end of a crankshaft, not shown. Two parallel tracks 14,16 are machined in the circumference of wheel 12. Track 14 comprises a series of long and short teeth 18 separated by complementary gaps 20. Track 16 is a constant diameter (toothless) track in which the diameter is less than the diameter of teeth 18 and greater than the diameter of the bottom of gaps 20. Closely positioned to and transverse to the tracks 14 and 16 is a sensor assembly 22 including two nominally identical magnetoresistors 24 and 26 mounted side by side on a block of a permanent bias magnet 28.

Figure 2:
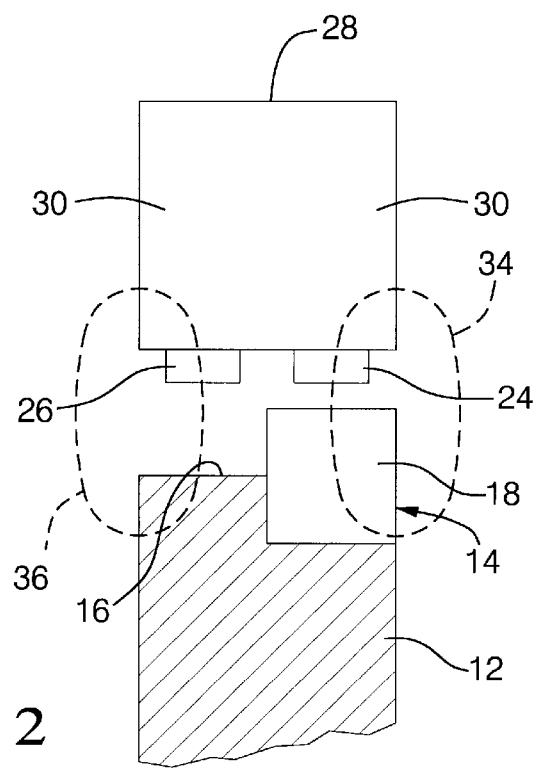
FIG. 2 is an enlarged side view of the magnetoresistor assembly and a sectional view of a portion of the adjacent target wheel of FIG. 1.

As better visualized in FIG. 2, the right side 30 of bias magnet 28 produces a magnetic field 34 interacting with magnetoresistor 24 and track 14. The left side 32 of bias magnet 28 produces a field that affects magnetoresistor 26 and track 16.

The magnetoresistors consist of a thin layer of magnetoresistive material such as a suitable film of an indium antimonide composition or the like whose electrical resistance varies predictably with the magnetic field strength that it experiences. Bias magnet 28 may be composed of any suitable coercive ferromagnetic material such as a rare earth-iron boron magnet. This invention is not limited to the use of any specific magnetoresistor or bias magnet.

The track regions 14,16 of wheel 12 are made of a low coercivity, ferromagnetic material such as a suitable low carbon steel. In the operation of the sensor combination 10 depicted in FIGS. 1 and 2, wheel 12 rotates with its crankshaft past magnetoresistors 24 and 26. As the magnetic teeth 18 and nonmagnetic gaps 20 on track 14 move past magnetoresistor 24, they each continually alter the magnetic field produced by bias magnet 28 in the vicinity of resistor 24. Thus, the resistance of magnetoresistor 24 is constantly changing as the wheel rotates and teeth and gaps of different lengths are passing resistor 24 and instantaneously and momentarily affecting the magnetic field that it sees. On the other hand, track 16 has a constant diameter. While both tracks have some affect on the magnetic field experienced by both magnetoresistors, smooth track 16 has the more pronounced effect on resistor 26 and, therefore, the resistance of sensor 26 changes less during each wheel rotation than the changes in the resistance of resistor 24. As described above, in a common practice the two magnetoresistors are powered by matched current sources, and the changes in their respective resistances are dictated by voltages generated at the magnetoresistors (see equations above).

Figure 4:
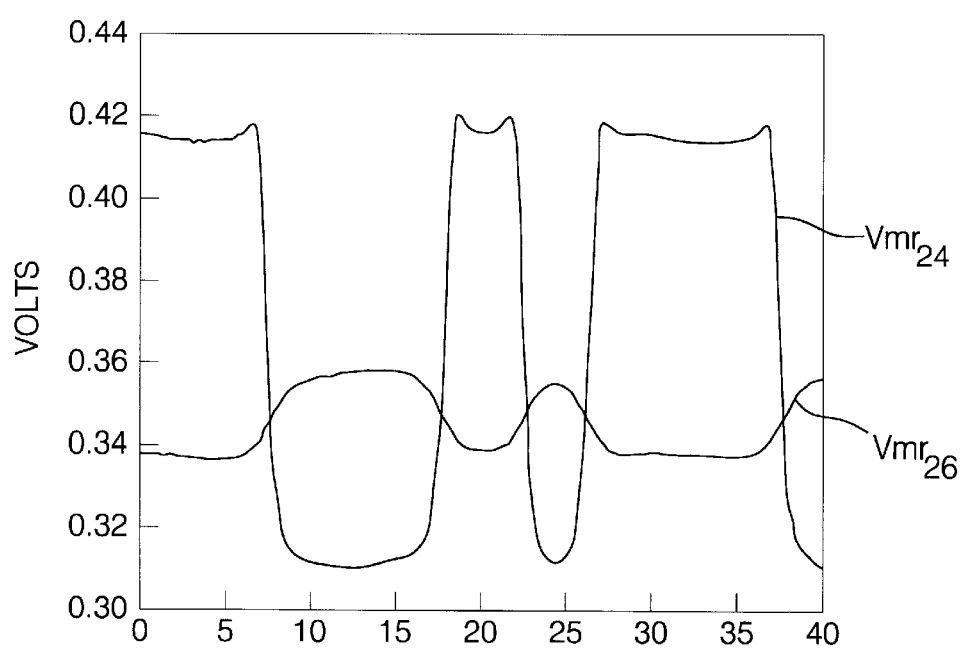
FIG. 4 is a graph of voltages across the magnetoresistors of FIGS. 1 and 2 versus the position angle of the target wheel.

FIG. 4 shows the voltages across magnetoresistors 24 and 26 during about 40 degrees of rotation of wheel 12. A comparator circuit in this commercial sensor assembly which interfaces these signals to the engine controller uses V $mr_{26}$ as a reference (a "−" input) and V $mr_{24}$ as a data input ("+" input). Any mismatches in the resistances of resistors 24 and 26, for example, will cause these signals to shift with respect to each other, and the result is that the starting position and duration of the pulses will be inaccurate. Thus, the process of this invention is to equalize the measured resistances of what are supposed to be identical magnetoresistors by altering the bias magnet. As stated above, despite efforts to control manufacturing practices, the resistances of the manufactured sensor elements are not equal.

It is also to be understood that the use of wheel 12 and the arrangement of teeth and gaps as displayed in FIG. 1 is simply illustrative of one arrangement for application of a two magnetoresistor-bias magnet assembly. Other arrangements are known as shown in the above-identified patents. However, the subject process is useful in equalizing resistances in any suitable such assembly.

The resistance of a current production magnetoresistor-bias magnet device was trimmed or equalized using the test arrangement shown in FIG. 4. It is known that a magnetized permanent magnet (see, e.g., U.S. Pat. No. 5,089,060) or an unmagnetized permanent magnet (see, e.g., U.S. Pat. No. 5,091,021) can be heated with a laser beam or the like in a spot or a pattern to change the properties of the magnet in the spot or pattern. The permanent magnet body is heated with the laser beam to a localized temperature near or above the Curie temperature or to a temperature sufficient to reduce the local magnetic coercivity. While the coercivity is lowered, the adjacent field of the unheated region of the magnet (or an external field) reduces the local magnetic field or remagnetizes the line or spot in the reverse direction. Alternatively, if a supplementary larger external magnetic field is applied during the heating and cooling, the local magnetic field of the heated portion could be increased. The period of heating at a particular spot is short, e.g., a period of seconds. Since only a small portion of the magnet body is heated, the surrounding unheated mass cools the heated spot or line when the laser beam has been moved or shut off. Such a practice is applied here to alter the local magnetic field of the permanent bias magnet in its assembly with two magnetoresistors.

Figure 3:
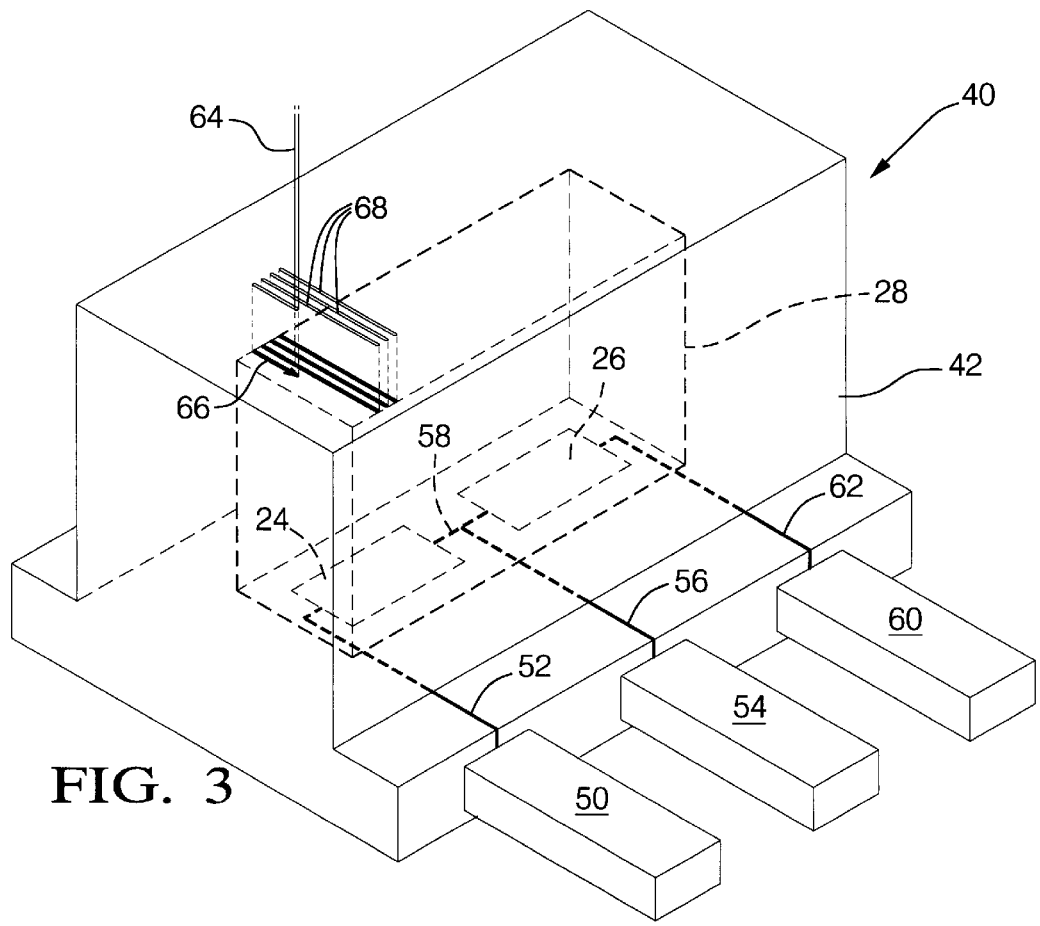
FIG. 3 is a perspective view of a magnetoresistor assembly in which the magnetoresistors are being trimmed by a practice of the method of this invention.

An arrangement for practice of the subject process in shown in FIG. 3. The bias magnet-magnetoresistor assembly is shown at 40 in perspective. The assembly 40 includes bias magnet 28 and magnetoresistors 24 and 26 partially encased by the manufacturer in plastic overmold 42. Electrical lead connections to the exposed magnetoresistors 24 and 26 are part of the package. For example, the connections include a first terminal 50 and lead 52 to magnetoresistor 24, a second terminal 54 and lead 56 to connection 58 between magnetoresistors 24 and 26, and a third terminal 60 and lead 62 to magnetoresistor 26. These terminals and leads are used to measure the resistance of mr's 24 and 26 in the quiescent field of permanent magnet 28 with no other ferromagnetic material affecting the field experienced by mr's 24 and 26.

The resistance of each of mr's 24 and 26 was measured on the assembly 40 as received. Since mr 24 had the greater resistance (see Table 1), the radiation from a 15 Watt Nd:YAG commercial marking laser (indicated at 64) was applied to the back side of bias magnet 24 in a linear scan as shown at 66 as shown in FIG. 3. The laser beam 64 burned through the exposed regions 68 of plastic overmold 42. The effect was to reduce the bias field—principally on mr 24, but somewhat on mr 26 to equalize their resistances. After a three second heat on bias magnet 28, the resistances of mr's 24 and 26 were again measured and this process repeated until they were substantially equal.

The steps taken and results are presented in Table 1. The significant feature of this data is that the original 1.6% mismatch was reduced to 0.06%.

TABLE 1

| $MR_{24}$ (ohms) | $MR_{26}$ (ohms) | Treatment | Mismatch |
|---|---|---|---|
| 1737 | 1708 | as delivered | 1.6% |
| 1734 | 1707 | +45 Watt seconds | 1.5% |
| 1723 | 1700 | +120 Watt seconds | 1.3% |
| 1703 | 1687 | +300 Watt seconds | 0.9% |
| 1683 | 1684 | +300 Watt seconds | 0.1% |

In the above-identified '060 patent, it was shown that a locally heated zone of a permanent magnet will reverse its magnetic order due to a self-demagnetization field if the local temperature approaches the Curie temperature of the material, or that there may be formation of oxides or nitrides which are non-magnetic in the heat effected zone. Both effects result in a modulation of the field above the magnet's surface. The process of that patent was directed to defining dense patterns on magnet surfaces for use as reading sensor targets. Obviously, the subject process is a different application of the phenomenon disclosed. In the subject process, a larger area is treated using a focused beam which is rastered or using an unfocused higher energy beam. Further, it is preferred to treat the opposite side of the magnet from where one cares about the magnetic field level. The '060 patent also showed that under processing conditions which yielded field reversal due to demagnetization effects, an external assist field opposing the bulk magnetization used during patterning could enhance the effect. A similar assist field during laser treatment would also be beneficial in this process, allowing for less heat to be dumped into the part, and for the cycle time per part to be decreased.

In addition to the embodiment of the invention described above, several other concepts were demonstrated which are related. The tests done above were conducted with no magnetically permeable material in the proximity of the sensor package. The process can also be practiced with similar results, see Table 2, when the active surface of the sensor (i.e., the two mr's) is in close proximity to a mild steel plate.

TABLE 2

| $MR_a$ (ohms) | $MR_b$ (ohms) | Treatment | Mismatch |
|---|---|---|---|
| 2246 | 2205 | as delivered | 1.8% |
| 2240 | 2201 | +30 Watt seconds | 1.7% |
| 2227 | 2197 | +60 Watt seconds | 1.3% |
| 2115 | 2193 | +90 Watt seconds | 1.0% |
| 2207 | 2190 | +120 Watt seconds | 0.8% |
| 2177 | 2167 | +150 Watt seconds | 0.4% |

The above treated sensor package using the mild steel plate was substantially the same as the sensor package treated in the first example (in air, no permeable material next to the mr's except the bias magnet). It is seen that the steel plate concentrates the magnetic field in the vicinity of the magnetoresistors and thereby produces a higher resistance in the sensors. Equalization of the magnetoresistors at the higher field level may better simulate the environment in which the assembly operates.

It has also been demonstrated that one can selectively lower the magnetization of the bias magnet by directing the laser beam onto the end surface of the sensor package closest to the higher resistance mr, rather than the back surface. This practice of treating a side surface is more effective in balancing the mr resistance than the geometry described above.

All of the tests conducted and described above were done on finished sensors which included a plastic overmold. The first dose would simply first burn through the plastic, and subsequent treatments would continue to affect the magnetics. Application of this process in a production situation would presumably occur through a window in the plastic overmolding. This would have these advantages: (1) The dose would not waste energy burning the plastic overmold, and (2) the plastic overmold obscures the precise location of the bias magnet, patterning directly on the magnets would allow much better spatial control of the affected area and improve the control of the process.

This specification has stressed the importance of using localized laser heating to trim sensors where the target has two distinct zones and the sensor package contains one sensor for each track. The same process of localized laser heating could be used to trim any sensor where there is an array of sensors mounted on a magnet. Specifically, the process is applicable to the presently used crankshaft angle sensors which use a "sequential" arrangement of two magnetoresistors and a target which only has one track. Another interesting application would be for the brushless motor/ "smart" wiper sensor. In this type of sensor, an array of six or more (depending on resolution) magnetoresistors is mounted on a permanent magnet and senses a target with many tracks. It is unlikely that the localized heating can be confined to the extent that a single element in the array could be adjusted independently; however, the coarse shape of the field could be altered, causing systematic differences in the quiescent resistance to be nullified.

While the invention has been described in terms of a few specific embodiments, it is apparent that other embodiments could easily be adapted by one skilled in the art. Accordingly, the scope of the invention is to be limited only by the following claims.

We claim:

1. A method of matching the electrical resistance of two magnetoresistor magnetic field sensors mounted on a magnetized permanent magnet body such that a first portion of said permanent magnet body provides a magnetic field affecting the resistance of said first sensor and a second portion of said permanent magnet body provides a magnetic field affecting the resistance of said second sensor, said method comprising measuring the electrical resistance values of each of said magnetoresistor sensors when they are experiencing said magnetic fields and comparing said values, and provided that the difference between said values exceeds a predetermined quantity, changing the magnetic field produced by one of said first or second portions of said permanent magnet body to reduce the difference between said values of said sensors, and again measuring the electrical resistance values of said sensors under the fields then produced by said permanent magnet and, if necessary, repeating said changing step and measuring step until the difference between said values is within said quantity.

2. A method of matching the electrical resistance of two magnetoresistor magnetic field sensors mounted on a magnetized permanent magnet body such that a first portion of said permanent magnet body provides a magnetic field affecting the resistance of said first sensor and a second portion of said permanent magnet body provides a magnetic field affecting the resistance of said second sensor, said method comprising measuring the electrical resistance values of each of said magnetoresistors when they are experiencing said magnetic fields and comparing said values, and provided that the difference between said values exceeds a predetermined quantity, reducing the magnetic field produced by one of said first or second portions of said permanent magnet body corresponding to the sensor having the higher said measured electrical resistance to reduce the resistance of said sensor, and again measuring the electrical resistance values of said sensors under the fields then produced by said permanent magnet and, if necessary, repeating said reducing step and measuring step until the difference between said values is within said quantity.

3. A method of matching the electrical resistance of two magnetoresistor magnetic field sensors mounted on a magnetized permanent magnet body such that a first portion of said permanent magnet body provides a magnetic field affecting the resistance of said first sensor and a second portion of said permanent magnet body provides a magnetic field affecting the resistance of said second sensor, said method comprising measuring the electrical resistance values of each of said magnetoresistors when they are experiencing said magnetic fields and comparing said values, and provided that the difference between said values exceeds a predetermined quantity, heating one of said first or second portions of said permanent magnet body corresponding to the sensor having the higher electrical resistance value to reduce the magnetic field produced by said portion and concomitantly the resistance of said sensor, again measuring the electrical resistance values of said sensors under said magnetic fields and, if necessary, repeating said heating step and measuring step until the difference between said values is within said quantity.

4. A method of matching the electrical resistance of two magnetoresistor magnetic field sensors as recited in claim 3 in which said measurements are made when said sensors are placed adjacent a magnetically permeable body.

5. A method of matching the electrical resistance of two magnetoresistor magnetic field sensors as recited in claim 3 in which said measurements are made when said sensors are not placed adjacent a magnetically permeable body.

6. A method of matching the electrical resistance of two magnetoresistor magnetic field sensors as recited in claim 3 in which said permanent magnet body is a rectangular block having a front face, a back face and first and second side faces; said magnetoresistors are mounted on the front face; said first portion includes said first side face and the adjacent part of said back face and said second portion includes said second side face and the adjacent part of the back face; and said heating is conducted on the back face part of said first or second portion.

7. A method of matching the electrical resistance of two magnetoresistor magnetic field sensors as recited in claim 6 in which said heating is conducted with a laser.

8. A method of matching the electrical resistance of two magnetoresistor magnetic field sensors as recited in claim 3 in which said heating is conducted with a laser.

9. A method of matching the electrical resistance of two magnetoresistor magnetic field sensors as recited in claim 3 in which said permanent magnet body is a rectangular block having a front face, a back face and first and second side faces; said magnetoresistors are mounted on the front face; said first portion includes said first side face and the adjacent part of said back face and said second portion includes said second side face and the adjacent part of the back face; and said heating is conducted on the side face part of said first or second portion.

10. A method of matching the electrical resistance of two magnetoresistor magnetic field sensors as recited in claim 7 in which said heating is conducted with a laser.

* * * * *